US007137743B2

(12) United States Patent
Graham et al.

(10) Patent No.: US 7,137,743 B2
(45) Date of Patent: Nov. 21, 2006

(54) VISUAL OPTICAL INDICATORS FOR PLUG ASSEMBLIES, CONNECTORS AND CABLES

(75) Inventors: Richard W. Graham, Derry, NH (US); Martin Q. Thornton, Lee, NH (US); Thomas A. Stewart, Meredith, NH (US); William M. Ferland, Somersworth, NH (US)

(73) Assignee: Enterasys Networks, Inc., Andover, MA (US)

( * ) Notice: Subject to any disclaimer, the term of this patent is extended or adjusted under 35 U.S.C. 154(b) by 0 days.

(21) Appl. No.: 10/858,416

(22) Filed: Jun. 1, 2004

(65) Prior Publication Data

US 2005/0266723 A1 Dec. 1, 2005

(51) Int. Cl.
*G02B 6/36* (2006.01)
*G02B 6/44* (2006.01)

(52) U.S. Cl. .......................... 385/88; 385/76; 385/114

(58) Field of Classification Search ................ 439/490; 385/88

See application file for complete search history.

(56) References Cited

U.S. PATENT DOCUMENTS

| | | | | |
|---|---|---|---|---|
| 5,207,594 | A * | 5/1993 | Olson | 439/490 |
| 5,613,873 | A | 3/1997 | Bell, Jr. | |
| 5,790,041 | A | 8/1998 | Lee | |
| 6,095,851 | A | 8/2000 | Laity et al. | |
| 6,159,037 | A | 12/2000 | Madsen et al. | |
| 6,224,417 | B1 | 5/2001 | Belopolsky et al. | |
| 6,241,550 | B1 | 6/2001 | Laity et al. | |
| 6,361,357 | B1 * | 3/2002 | Stillwell et al. | 439/490 |
| 6,483,712 | B1 | 11/2002 | Oliphant et al. | |
| 6,908,334 | B1 * | 6/2005 | Huang | 439/491 |
| 2001/0027055 | A1 | 10/2001 | Laity et al. | |
| 2004/0071410 | A1 * | 4/2004 | Ma | 385/88 |
| 2005/0032415 | A1 * | 2/2005 | Sakamoto | 439/490 |
| 2005/0124209 | A1 * | 6/2005 | Currie et al. | 439/490 |

FOREIGN PATENT DOCUMENTS

| | | |
|---|---|---|
| WO | WO 95/26582 | 10/1995 |
| WO | WO 00/17968 | 3/2000 |
| WO | WO 00/26997 | 5/2000 |

* cited by examiner

*Primary Examiner*—Frank G. Font
*Assistant Examiner*—Eric Wong
(74) *Attorney, Agent, or Firm*—Sampson & Associates P.C.

(57) ABSTRACT

A plug assembly is provided with integral optical indication. The plug assembly includes a housing having a leading portion and a trailing portion. The leading portion is configured for information exchanging engagement with an internally illuminated receptacle sized and shaped to releasably receive said leading portion therein. The receptacle is configured to radiate light onto the leading portion of the plug. This leading portion includes a light collector configured to receive the light, which is then conveyed via an optical coupling to an optical indicator located on the trailing portion of the plug assembly. The indicator has optical properties distinct from those of said trailing portion to facilitate viewing.

29 Claims, 12 Drawing Sheets

VISUAL OPTICAL INDICATORS FOR PLUG ASSEMBLIES, CONNECTORS AND CABLES

RELATED APPLICATION

This application is related to U.S. patent application Ser. No. 10/737,652 entitled MODULAR RECEPTACLE AND INTERFACE WITH INTEGRAL OPTICAL INDICATION, filed on Dec. 17, 2003.

BACKGROUND

1. Technical Field

This invention relates to connectors, and more particularly to plug assemblies including cables having integral optical displays.

2. Background Information

Receptacle assemblies have routinely been provided with optical indicators for status indication. The indicators have typically consisted of LEDs (Light Emitting Diodes) or light pipe ends located on the assembly face plane adjacent the individual receptacles. These indicators are then selectively illuminated to provide visual information relating to the particular receptacle. A drawback of this approach, however, is that the indicators take up valuable surface area on face plane, which limits the density of receptacles thereon.

One approach towards addressing this drawback is disclosed in the above referenced and commonly assigned U.S. patent application Ser. No. 10/737,652 (the '652 application) which is fully incorporated herein, by reference. This approach utilizes light pipes to selectively illuminate the interior of a receptacle, which in turn, illuminates a conventional transparent plug assembly inserted therein. However, the information conveyed by such illumination is inherently limited by the type and quality of material used to fabricate these plug assemblies. Moreover, this approach fails to accommodate other types of plug assemblies, such as conventional opaque plug assemblies and multi-pin connectors. Thus, a need exists for an improved visual display for plug assemblies, connectors, and the like.

SUMMARY

An embodiment of the present invention includes a plug assembly with integral optical indication. The plug assembly includes a substantially opaque housing having a leading portion and a trailing portion. The leading portion is configured for information exchanging engagement with an illuminated receptacle sized and shaped to releasably receive said leading portion therein. The receptacle includes one or more light pipes extending to the receptacle from a light source to radiate light onto the leading portion of the plug. The leading portion includes a light collector configured to receive the light, which is then conveyed via an optical coupling to a passive optical indicator located on the trailing portion of the housing. The indicator has optical properties distinct from those of said trailing portion to facilitate viewing.

Another aspect of the invention includes a plug assembly having integral optical indication. The plug assembly includes a housing having a leading portion and a trailing portion. The leading portion is configured for information exchanging engagement with an illuminated receptacle, and includes a light collector configured to receive light from the illuminated receptacle. The trailing portion includes a passive optical indicator and an optical coupling. The optical coupling is configured to optically couple the optical indicator to the light collector, so that light travels therethrough from the leading portion to the trailing portion. The optical indicator has optical properties distinct from those of other portions of the trailing portion.

Another aspect of the invention includes a method for providing a plug assembly with integral optical indication. The method includes providing a housing having a leading portion and a trailing portion, and configuring the leading portion for information exchanging engagement with an illuminated receptacle. At least one light collector is placed on the leading portion to receive light from the illuminated receptacle, and at least one passive optical indicator is placed on the trailing portion. The method also includes optically coupling the passive optical indicator to the light collector, so that light travels therethrough from the leading portion to the trailing portion; and providing the passive optical indicator with optical properties distinct from those of other portions of said trailing portion.

BRIEF DESCRIPTION OF THE DRAWINGS

The above and other features and advantages of this invention will be more readily apparent from a reading of the following detailed description of various aspects of the invention taken in conjunction with the accompanying drawings, in which.

DETAILED DESCRIPTION

Figure 1B:
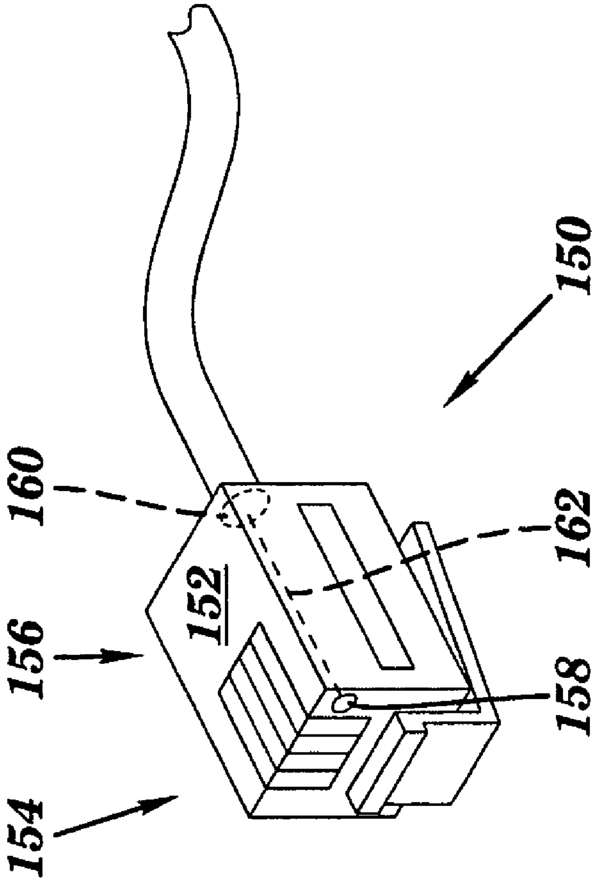
FIGS. 1A and 1B are schematic side elevation and perspective views, respectively, with portions shown in phantom, of an embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings shall be indicated with like reference numerals and similar features as shown in alternate embodiments in the drawings shall be indicated with similar reference numerals.

Referring to the figures, embodiments of the present invention are shown. Briefly described, these embodiments include various plugs and/or connectors (referred to collectively herein as ‘plugs’ or ‘plug assemblies’) configured to receive and display light from illuminated receptacles upon receipt therein.

Advantageously, these embodiments enable plug assemblies, including those that may be generally opaque to light, to convey status and other information via illumination of the receptacle, such as described in the above-referenced ’652 application, which is fully incorporated herein by reference.

Figure 1A:
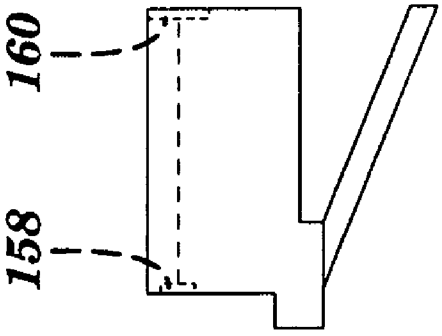
Figure 2:
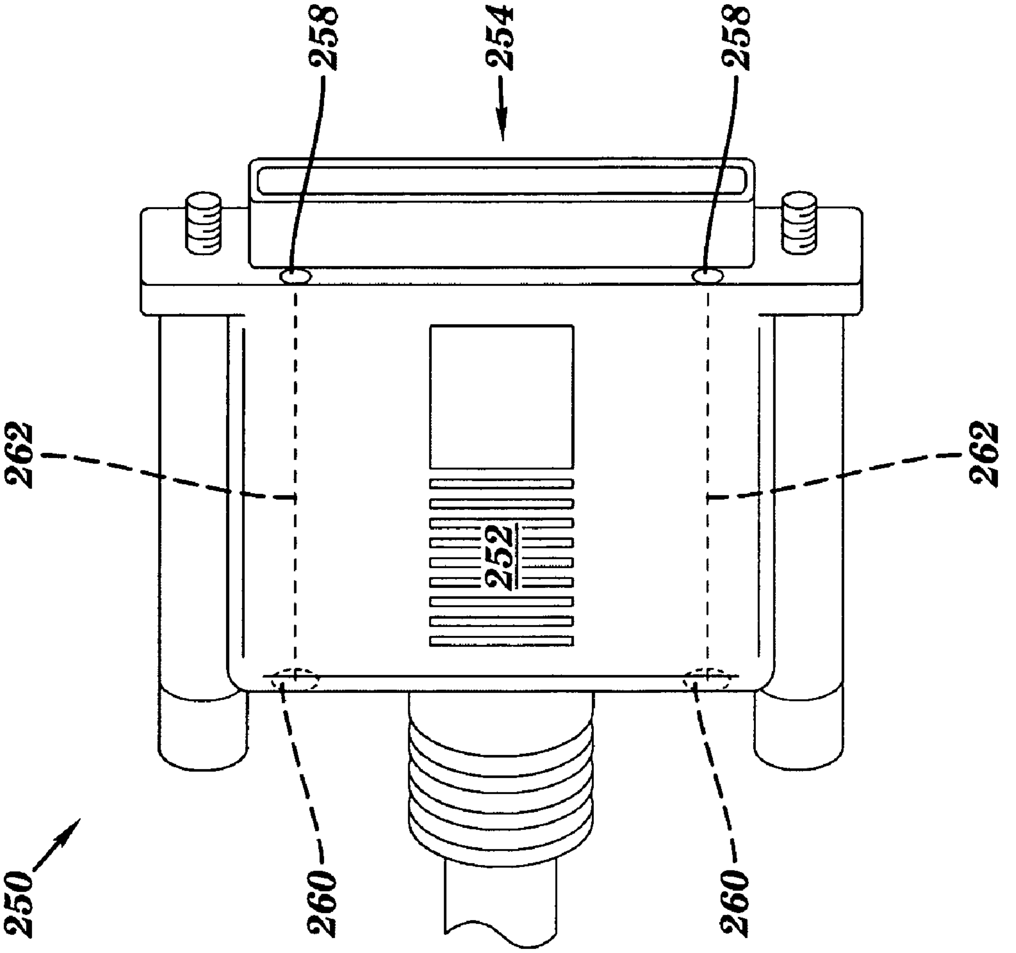
FIGS. 2 and 3A are perspective views, with portions shown in phantom, of an alternate embodiments of the present invention.

For example, as shown in FIGS. 1 and 2, a plug assembly of the present invention includes a substantially opaque housing having a leading portion and a trailing portion. The leading portion is configured for information exchanging engagement with an illuminated receptacle (not shown) such as of the type described in the above-referenced ’652 application, having a light pipe configured to radiate light onto the leading portion of the plug.

The leading portion includes a light collector configured to receive the radiated light, and convey it via an optical coupling to a passive optical indicator located on the trailing portion of the housing. The optical indicator has optical properties distinct from those of said trailing portion in general, to facilitate viewing by a user.

As shown, embodiments of the invention may include generally opaque plug assemblies, or may be used to enhance the visibility of optical signals in transparent or translucent plug assemblies. For example, these embodiments may be used to distinguishably display multiple optical signals, such as light from multiple sources, to provide relatively high information density relative to conventional transparent plug assemblies.

Advantageously, the optical indicators of these embodiments use available surface area of plug assemblies for optical indication, enabling conventional indicators to be removed from the face plane of receptacle assemblies where they tend to limit the receptacle density and are often obscured by the plug assemblies and/or cables connected thereto. Embodiments of this invention are also relatively easy and inexpensive to manufacture, since optical components thereof, such as light pipes and optical fibers may be easily molded integrally with the plug assemblies.

Although many embodiments described below utilize single optical indicators, the skilled artisan should recognize that any number of optical indicators, collectors, and/or couplings may be used. This use of multiple indicators advantageously increases the amount of information that may be conveyed. For example, a green light source may be activated within the receptacle to provide visible feedback to the user that the plug assembly has been mated to the desired receptacle. Mating to an improper receptacle may activate a red light source to indicate improper mating or placement of the plug. The skilled artisan, in light of the teachings herein, will recognize that substantially any coding scheme, including use of various light colors, blink rate(s), and/or other conventional coding techniques, may be used, without departing from the spirit and scope of the present invention.

Moreover, embodiments of the present invention advantageously enable information to be displayed on a plug assembly in a non-electrical, non-conductive (no electrical conductors that may generate electrical noise), and thus electrically isolated, unpowered manner. This enables the plug assemblies to be applied to any type of plug/receptacle combination, including those configured for electrical, electro-optical, and/or purely optical information exchange.

In addition, the disclosed embodiments also enable their components to be tailored individually for specific applications. For example, display portions (e.g., optical indicators) may be relatively enlarged for ease of viewing, while the optical conductors, e.g., light pipes, may be relatively small (e.g., in transverse cross section) to enable them to fit easily within even the housing of even relatively small plug assemblies. These components are also relatively inexpensive and easy to incorporate into existing plug assembly technologies, and are versatile with regard to placement therein. For example, components of these embodiments may be incorporated into conventional plug assembly alignment posts, strain reliefs, housings, or shields. These embodiments also enable more information to be conveyed than generally provided by conventional indicators, due to the increased area available for optical indication on plug assembly housings, the density with which various components (e.g., optical couplings) may be configured, and the ability to provide indicators having backlit indicia.

Where used in this disclosure, the term ‘axial’ when used in connection with an element described herein, refers to a direction relative to the element, which is substantially parallel to the direction of insertion of the plug assembly into a suitable illuminated receptacle. Similarly, the term ‘transverse’ refers to a direction other than substantially parallel to the axial direction. The term ‘transverse cross-section’ refers to a cross-section taken along a transverse plane. The term ‘light’ broadly refers to nominally any type of radiation, including electromagnetic (EM) radiation in or out of what is commonly considered to be the visible spectrum. This term may thus include EM radiation in the infra-red (IR) and/or ultra-violet (UV) ranges, or beyond. For example, light which is not visible to the eye, may be used in combination with an optical indicator fabricated or coated with a material that will glow, luminesse, or otherwise become visible when such non-visible light is incident thereon. The term ‘passive’ refers to a construction that does not require external electric power to operate, but rather, is powered solely by light incident thereon or passing therethrough, and as may be further defined herein. The term ‘illuminated receptacle’ refers to receptacles having nominally any type of illumination associated therewith, including interior illumination as described in the above-referenced ’652 application, and/or exterior illumination. Exterior illumination may be provided by illumination sources and/or displays spaced from the receptacle (such as, for example, on a face plane or other component located in sufficient proximity to the receptacle that a plug assembly coupled to the receptacle may receive the illumination thereon). The term ‘leading portion’ refers to a portion of a plug assembly configured for information exchanging engagement with an illuminated receptacle. The term ‘trailing portion’ refers to substantially any portion of the plug assembly other than the leading portion thereof. Moreover, the terms ‘leading portion’ and ‘trailing portion’ may be selectively reversed in particular embodiments, such as those plug assemblies having multiple connectors as discussed hereinbelow with respect to FIGS. 9–11.

Referring now to the Figures, various aspects and embodiments of the present invention will be described in detail. Turning to FIGS. 1A and 1B, an embodiment of the present invention includes a plug assembly 150 having integral optical indication. In this embodiment, plug assembly 150 includes a housing 152 having a leading portion 154 and a trailing portion 156. The leading portion is configured for information exchanging engagement with an internally illuminated receptacle (not shown) of the type described in the above-referenced ’652 application, which includes a light pipe extending to the receptacle interior from a light source. Leading portion 154 includes a light collector 158 configured to receive light from the illuminated receptacle. Housing 152 includes a passive optical indicator 160 located on the trailing portion 156 of the housing, and as shown, is coupled via optic coupling 162, to light collector 158. Optical coupling 162 may include substantially any configuration capable of facilitating optical connection between the collector 158 and indicator 160. For example, the optical coupling may include fiber optics including one or more optical fibers or a light pipe fabricated from a rigid or semi-rigid material. As a still further alternative, optical coupling may simply include an air gap or channel, through which light may travel. Moreover, any of the embodiments of optical couplings discussed herein may include reflective elements, such as mirrors or portions otherwise having refractive indices sufficient to direct the light in a desired direction therethrough as described below with respect to optical coupling 162.

Indicator 160 is provided with optical properties distinct from those of said trailing portion to enable it to be visually discerned by users. For example, indicator 160 may be fashioned as a diffuser, e.g., formed as a convex bubble portion molded or otherwise provided on trailing portion 156 of a conventional RJ-XX plug assembly 150 as shown. In such an embodiment, optical coupling 162 may simply include an optically transmissive portion of the housing. Optionally, coupling 162 may include a discrete light pipe disposed integrally with housing 152, such as by molding in-situ therewith. As a further variation of this approach, coupling 162 may simply include a portion of the housing fabricated to have a different index of refraction than that of the surrounding portion(s) of housing 152. In these latter examples, indicator 160 may comprise the terminal end of optical coupling 162.

Turning now to FIG. 2, another embodiment includes plug assembly 250 of the type having a conventional opaque housing 252. In this embodiment, light collectors 258 are disposed on a flange of leading portion 254 to receive light upon engagement with an illuminated receptacle (not shown). Optical coupling 262 transmits the collected light to passive optical indicator 260 located on the trailing portion 256. In particular embodiments, coupling 262 extends through the plug assembly (as shown with phantom lines). Indicator 260 may be fabricated in the manner discussed with respect to indicator 160 above, such as simply comprising one end of optical coupling 162.

Figure 3A:
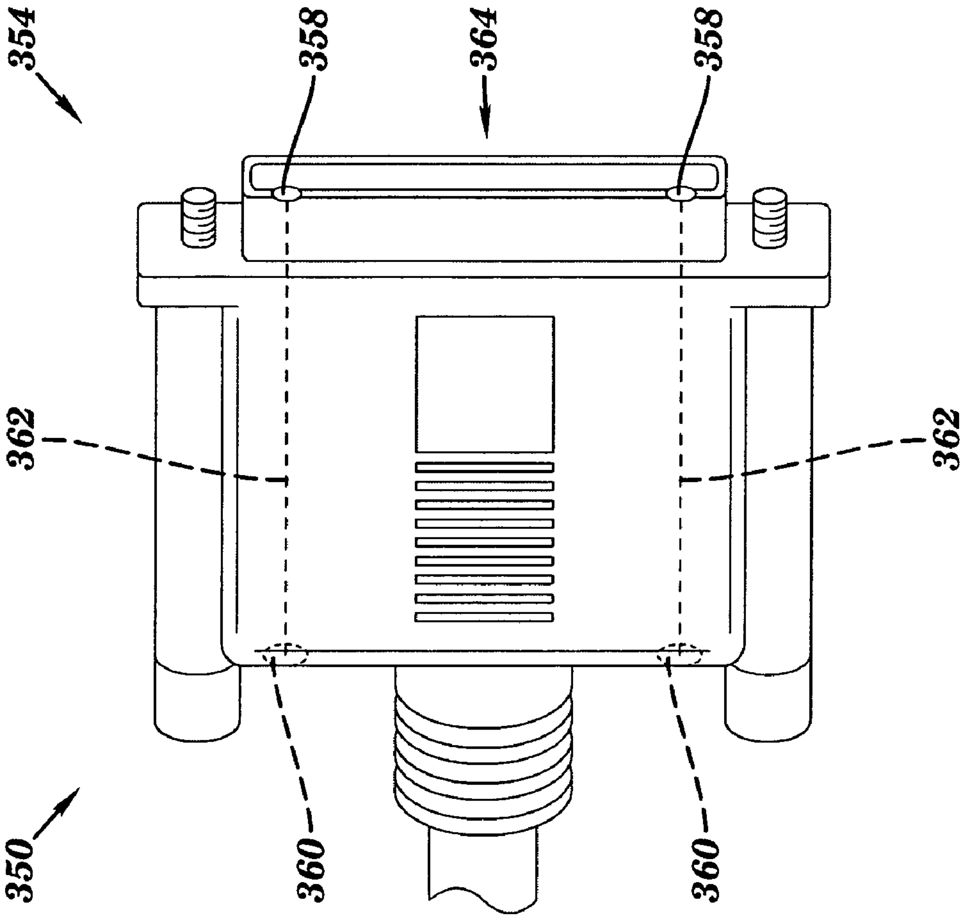
Figure 3B:
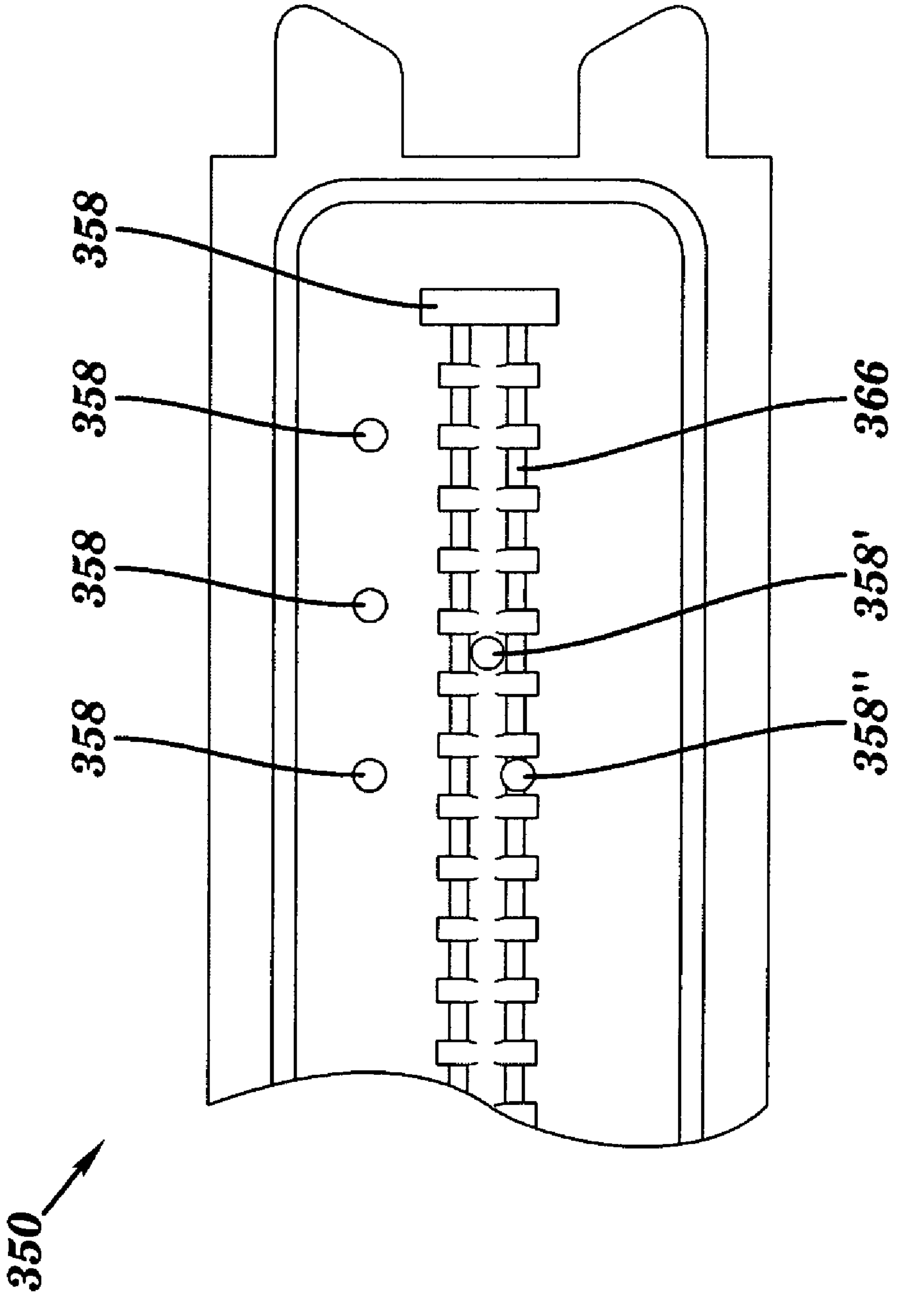
FIG. 3B is a perspective front elevational view of the embodiment of FIG. 3A.

Referring now to FIGS. 3A and 3B, in another embodiment, plug assembly 350 is substantially similar to plug assembly 250, but for the placement of light collectors 358 disposed generally within pin field 364 of leading portion 354. Optical coupling 362 transmits the collected light to passive optical indicator(s) 360 located on the trailing portion 356. As best shown in FIG. 3B, collectors may be disposed substantially anywhere within pin field 364, such as adjacent the pins 366 as shown at 358, or between the pins, as shown as 358'. Alternatively, the collectors may be disposed in place of one or more of the pins, such as shown at 358".

Figure 4:
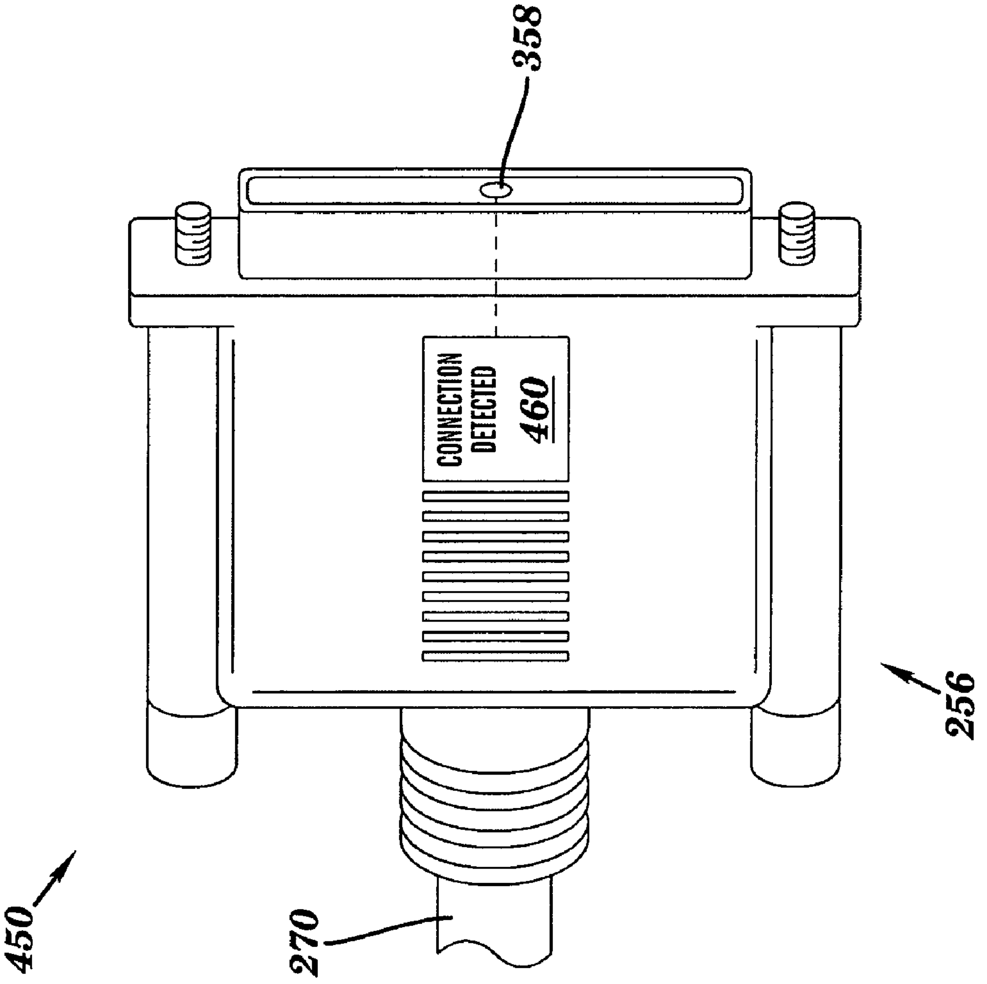
FIGS. 4–7 are views similar to those of FIGS. 2 and 3A, of additional embodiments of the present invention.
Figure 5:
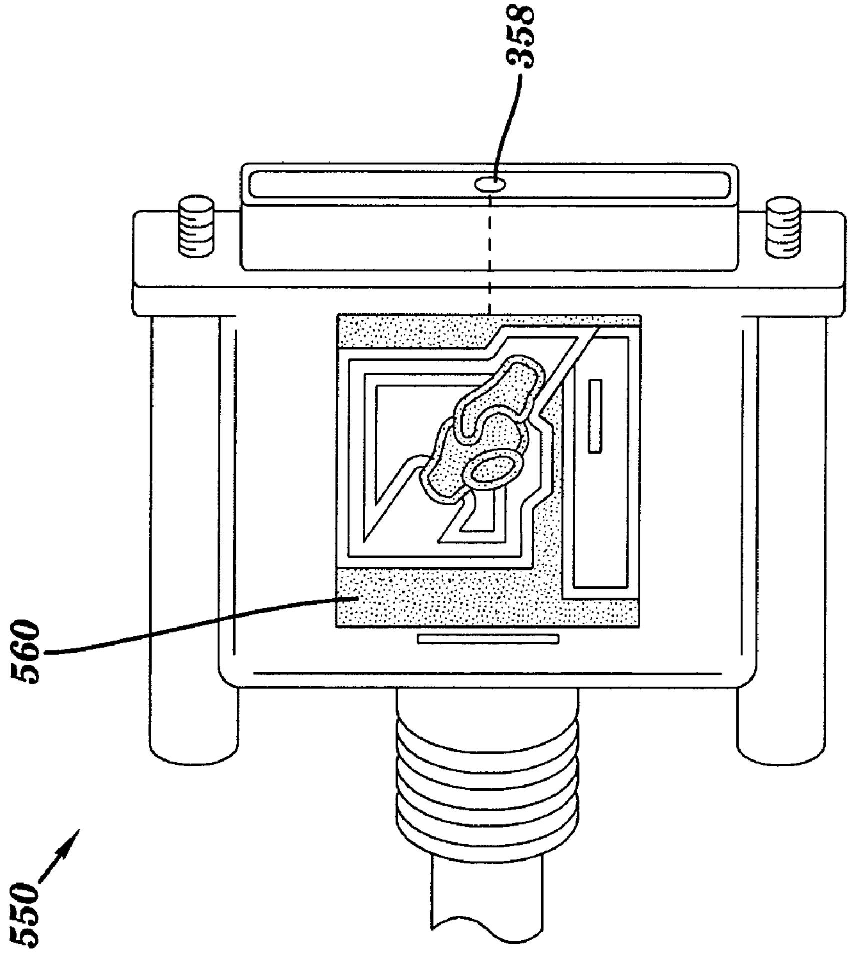

Turning now to FIGS. 4 and 5, variations of the foregoing embodiments are shown as plug assemblies 450, 550. These variations include an optical indicator 460, 560 in the form of a panel which may be backlit by the light captured by collector 358. These indicators may include indicia such as alphanumeric characters (e.g., 'Connection Detected', FIG. 4) or an icon (FIG. 5) to alert a user of a particular condition or status when illuminated. Moreover, although indicators 460, 560 are shown as disposed on a side surface of trailing portion 256, the skilled artisan should recognize that indicator 460 may be placed substantially anywhere on the plug, including end or side surfaces, or even on cable 270 (as discussed below), without departing from the spirit and scope of this invention.

Figure 6:
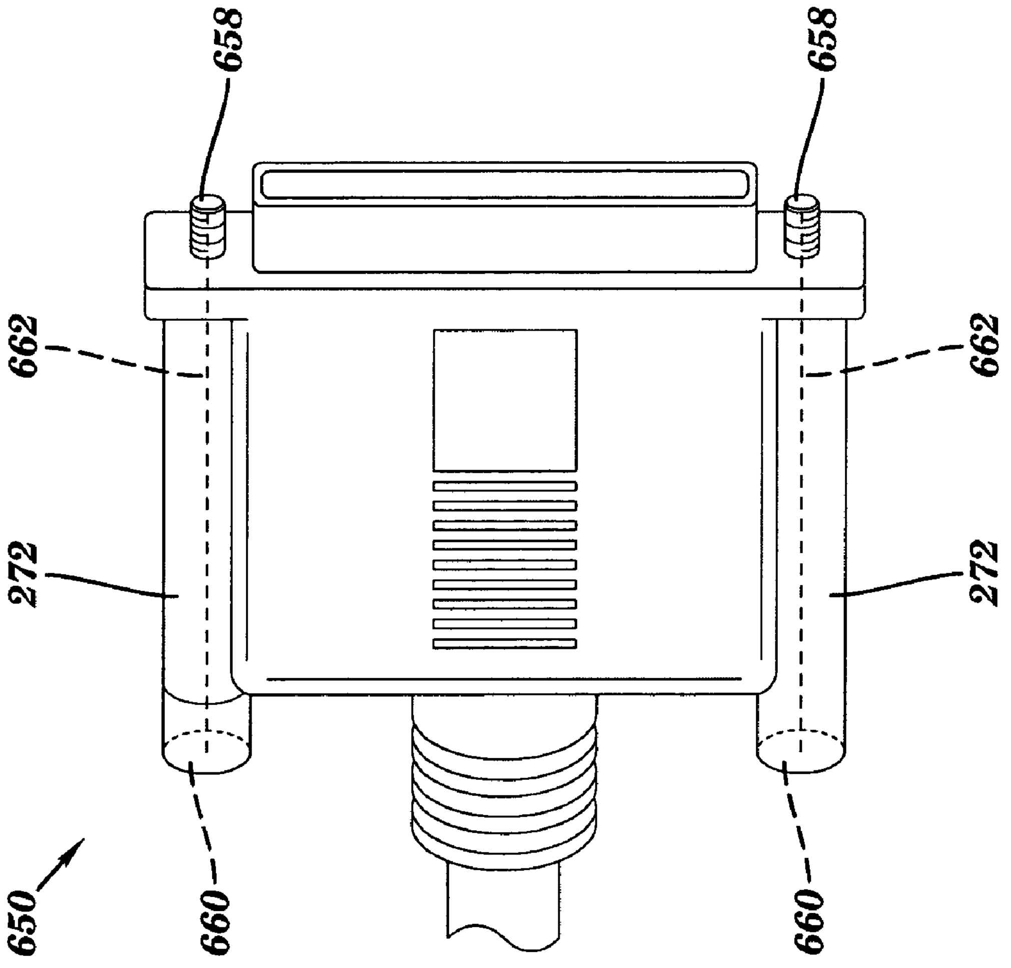

Referring to FIG. 6, a still further embodiment of the present invention is shown as plug assembly 650. In this configuration, collector 658, indicator 660, and optical coupling 662 are all disposed within the otherwise conventional mounting hardware, i.e., fasteners, 272. Advantageously, this configuration lends itself to retrofit applications, since legacy plug assemblies may be easily retrofitted for use with illuminated receptacles simply by replacing conventional fasteners with fasteners 272 as described herein.

Figure 7:
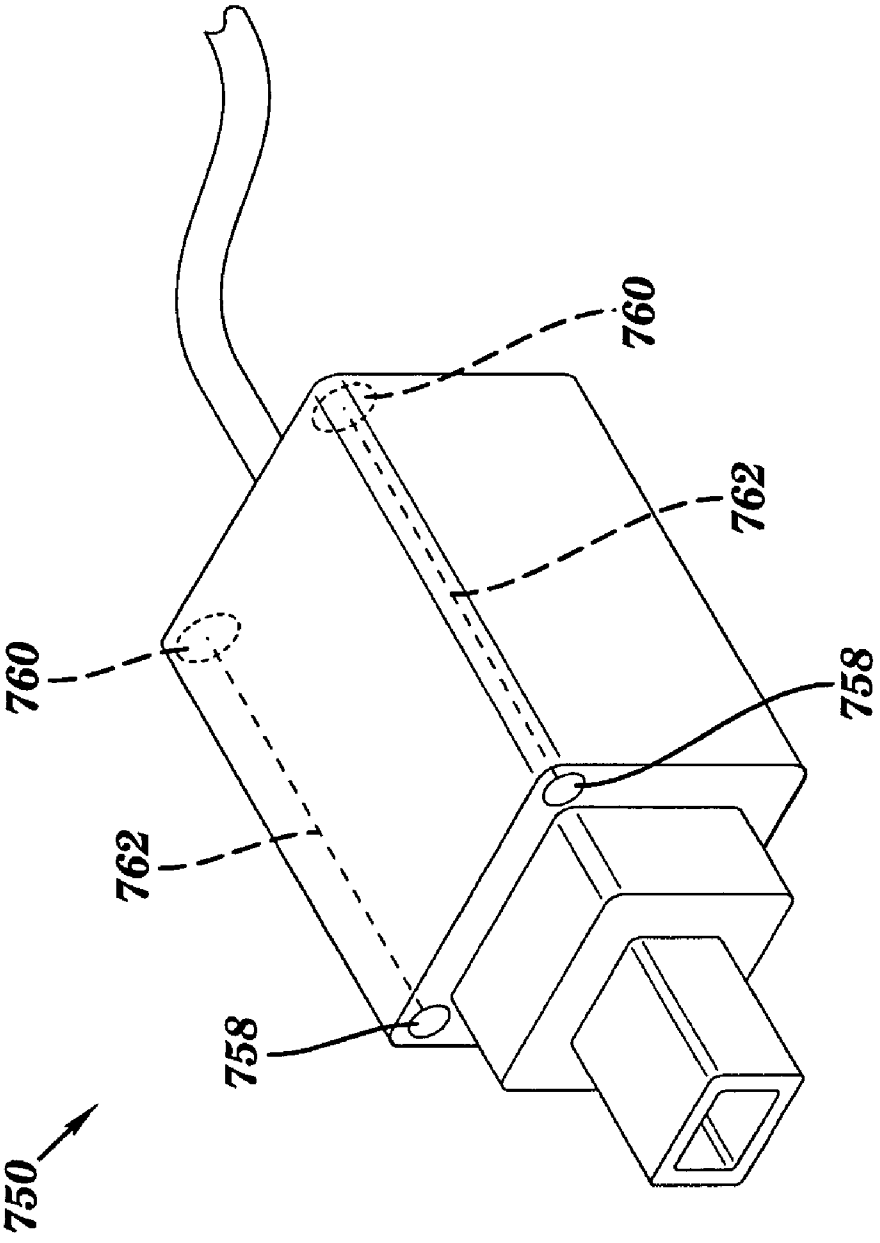
Figure 8C:
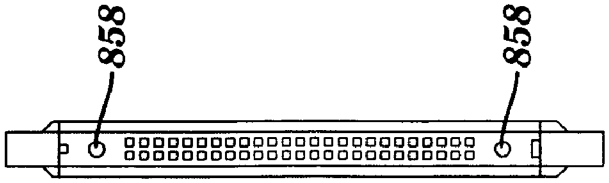
FIGS. 8A–8C are rear elevational, plan, and front schematic elevational views, respectively, with portions shown in phantom, of yet another embodiment of the present invention.
Figure 8B:
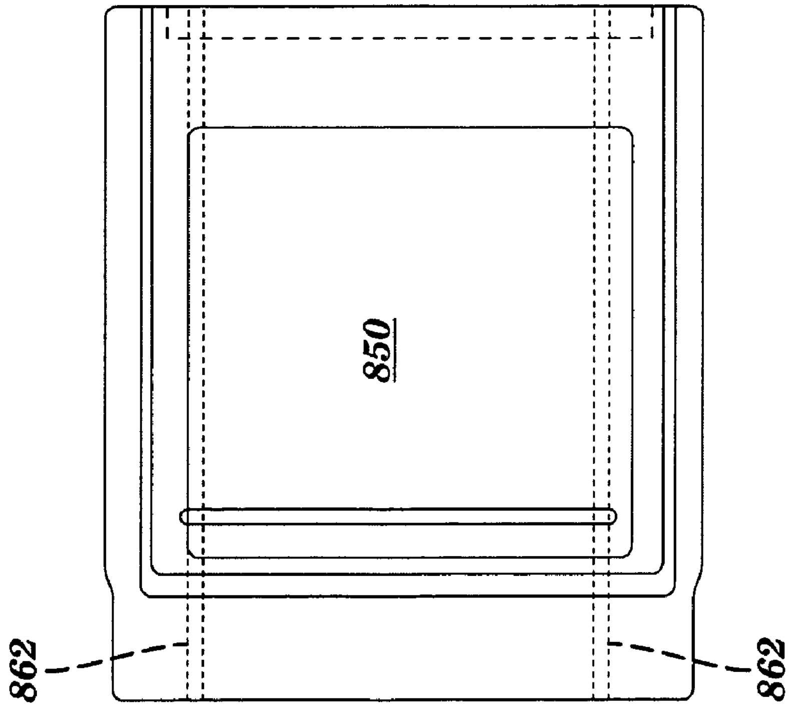
Figure 8A:
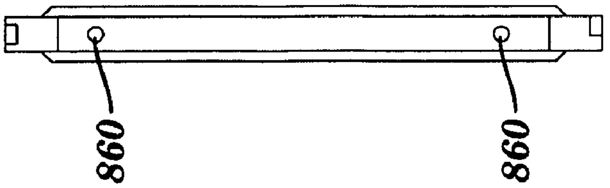

In another embodiment shown in FIG. 7, plug assembly 750 demonstrates use of collectors 758, indicators 760, and optical couplings 762 disposed within an otherwise conventional USB plug. Similarly, plug assembly 850 of FIGS. 8A–8C includes an otherwise conventional PCMCIA device (e.g., compact flash memory or 'PC Card'), configured with collectors 858, indicators 860, and optical couplings 862 in the manner discussed hereinabove.

Thus, the embodiments shown and described herein demonstrate that the teachings thereof are applicable to a wide variety of plug assembly types. These exemplary plug assembly styles include, but are not limited to: RJ-XX (e.g., RJ21, RJ45, RJ28, RJ11); MMJ; keyed; Compu-shield™; Krone™; Dsub (e.g., D9, D15, D25, D37, D50); Hybrids; Leaf style (e.g., Centronics™, USB, Infiniband/10Genet); and Fiber receptacle assemblies (e.g., MTRJ, LC, SC, ST, FDDI). While representative, these plug assembly types/styles are not to be construed as being exhaustive, and those skilled in the art should recognize that the teachings hereof may be applied to substantially any type of plug assembly or connector without departing from the spirit and scope of the present invention.

The trailing portion of the plug assembly on which optical indicators are disposed, may include substantially any portion thereof (including the (leading) portion configured for information-exchanging engagement with an illuminated receptacle). Thus, in any of the embodiments discussed herein, the trailing portion of the plug assembly may include cable(s) and end connector(s) coupled thereto. For example, turning now to FIGS. 9–11, trailing portions 956, 1056, 1156 of plug assemblies 950, 1050 and 1150, respectively, each include a cable 970 having a proximal end and extending to a distal end. The distal ends are respectively coupled to end connectors 974 and 1174. End connectors 974 and 1174 may be of substantially any type, including those commonly used to interface with peripheral devices such as printers and the like. The skilled artisan will recognize that these plug assemblies may be effectively reversed, e.g., the end connectors may be considered the 'leading portions' and configured with optical collectors, etc., without departing from the spirit and scope of the present invention.

Figure 9:
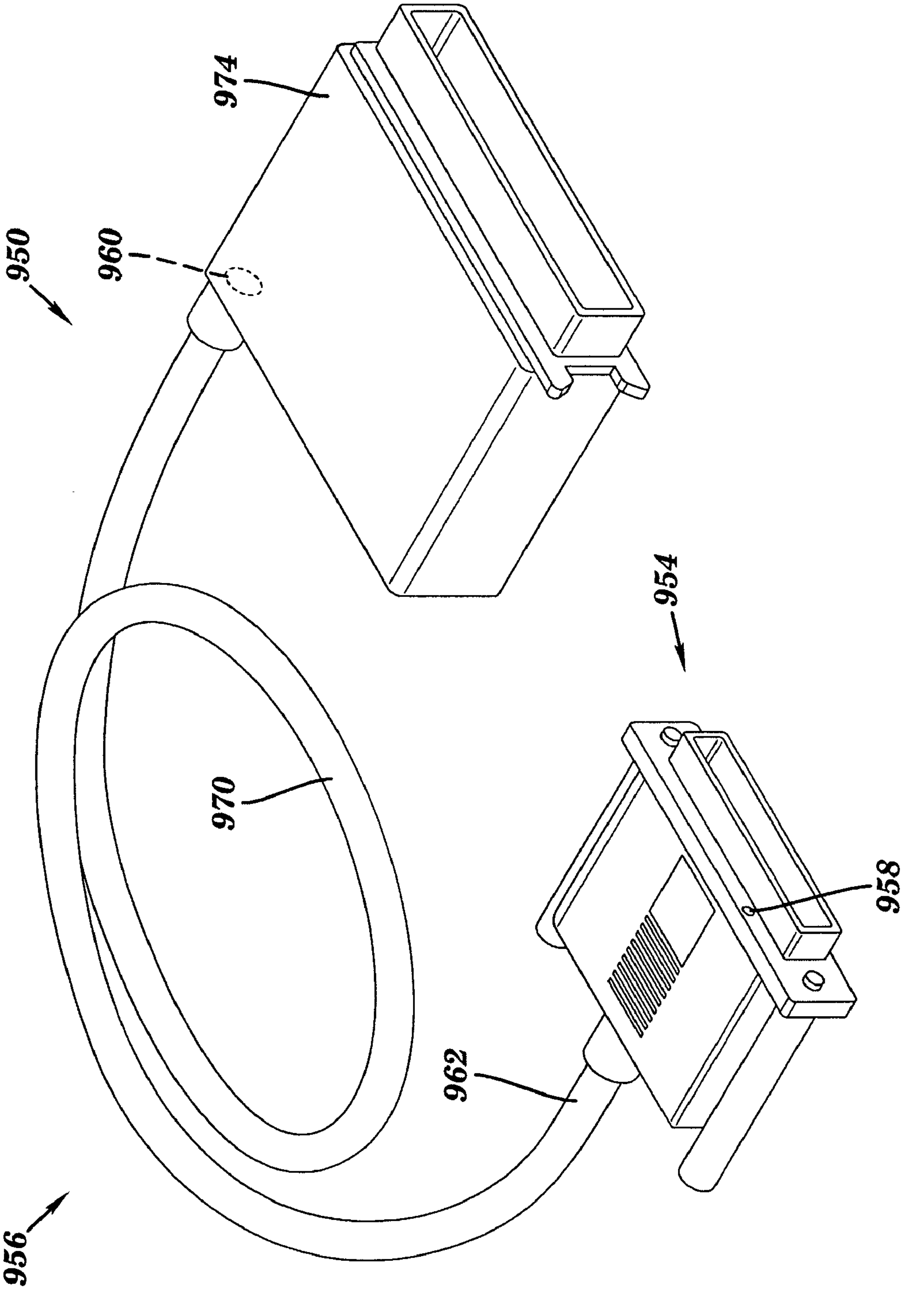
FIGS. 9–11 are perspective views of still further embodiments of the present invention.
Figure 10:
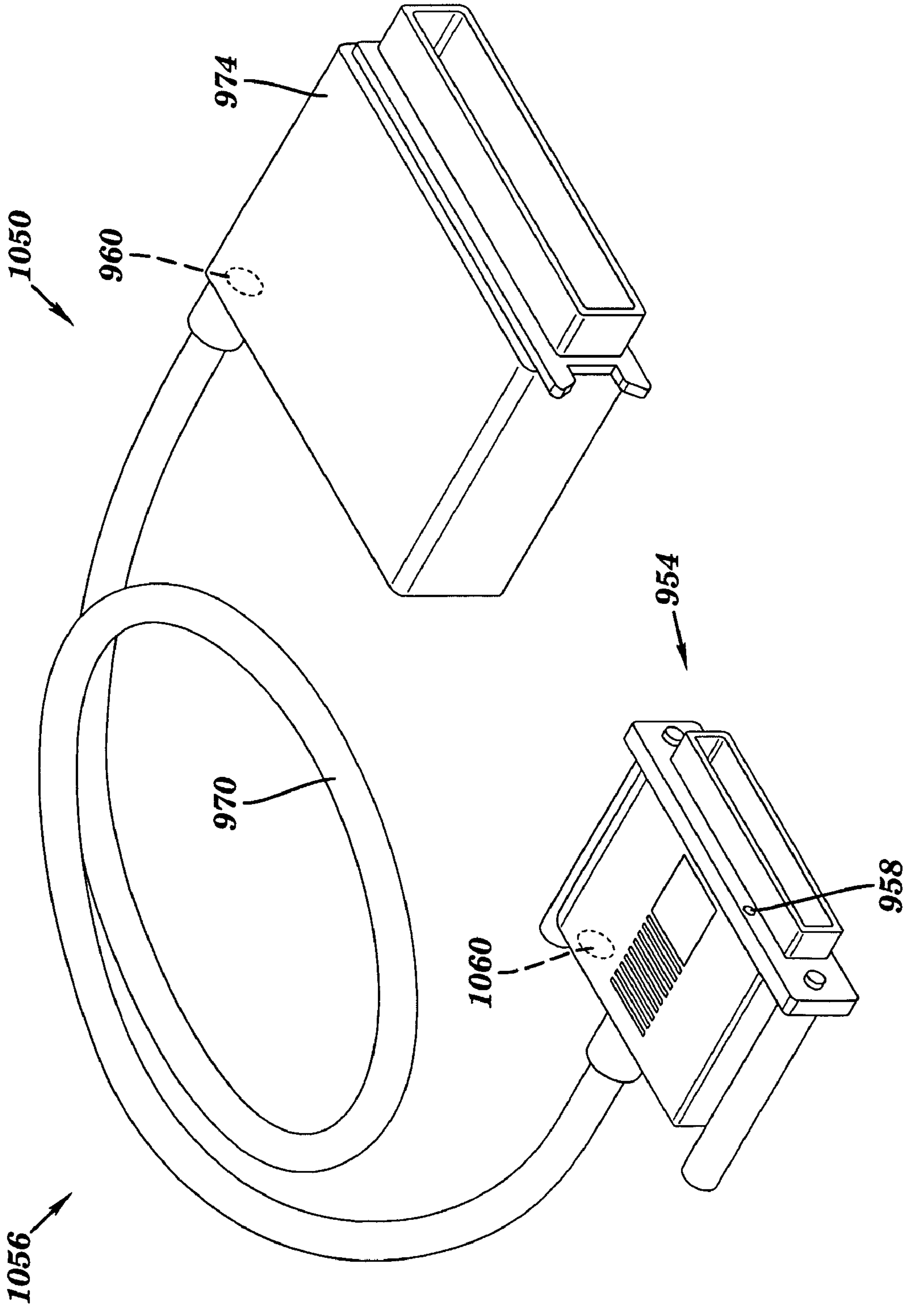
Figure 11:
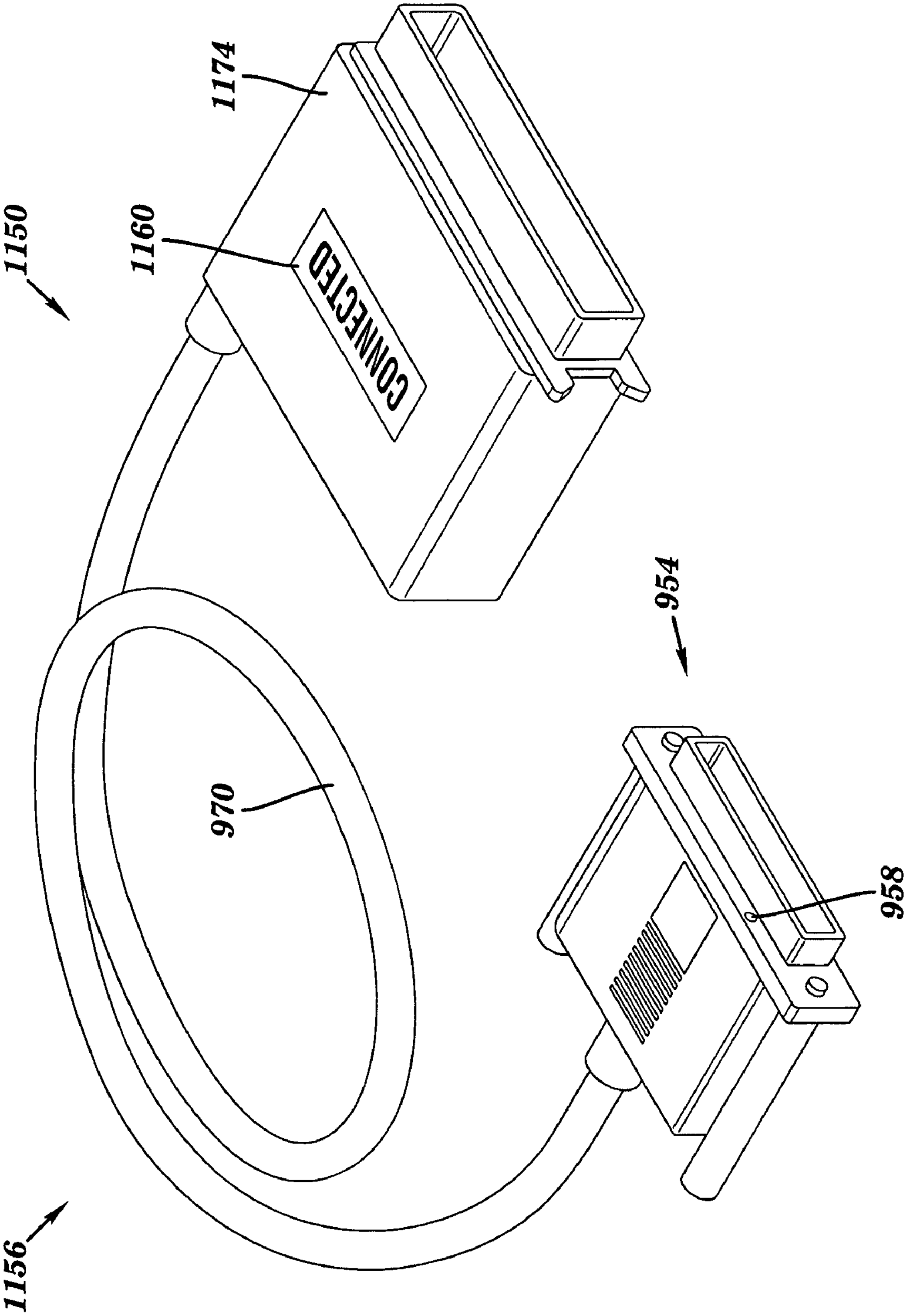

In these embodiments, cable 970 is provided with suitable optical coupling 962, such as in the form of fiber optics discussed above, which extends along the length thereof. In each of the plug assemblies 950, 1050 and 1150, coupling 962 couples at least one collector 958 to an indicator. As shown in FIGS. 9 and 10, couplings 962 of plug assemblies 950 and 1050 each extend to indicators 960 disposed on an end connector 974.

In addition, plug assembly 1050 also includes an indicator 1060 disposed on the housing upstream of cable 970. Plug assembly 1050 thus advantageously provides optical indication at both ends of cable 970, which may be particularly useful in applications requiring relatively long cable runs.

Although it is contemplated that both optical indicators 960 and 1060 may be configured to provide nominally identical information, such as a notification that leading portion 954 of the plug assembly is connected to a suitable receptacle, they may also be configured to convey mutually distinct information, without departing from the scope of this invention.

Plug assembly 1150 is substantially similar to plug assembly 950, though including a backlit optical indicator 1160 (of the type shown in FIG. 4 or 5), in lieu of indicator 960.

It should be understood by those skilled in the art, that aspects of any one of the foregoing embodiments may be applied to one or more of any of the other foregoing embodiments, without departing from the spirit and scope of the present invention.

Moreover, the skilled artisan should recognize that in any of the embodiments discussed herein, the light coupling and/or transmitting components thereof may be fabricated as unitary components, i.e., of nominally the same construction at various points along their lengths. Alternatively, these components may include multiple sections for ease of construction and/or to enhance particular (e.g., light propagating) properties thereof. Moreover, portions thereof may be sized and shaped to gather light from several light collectors, e.g., by providing a junction in the form of a frusto-conical (cone) shape, which may include multiple lenses on the base thereof, and/or a multi-fiber furcation, such as shown in the above referenced '652 application. These junctions may also be used in a reverse orientation to spread light, e.g., to multiple indicators.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

Having thus described the invention, what is claimed is:

1. A plug assembly with integral optical indication, the plug assembly comprising:
- a housing having a leading portion and a trailing portion;
- said leading portion configured for information exchanging engagement with an illuminated receptacle;
- said leading portion including one or more light collectors configured to receive light from the illuminated receptacle;
- one or more passive optical indicators disposed on said trailing portion;
- one or more optical couplings configured to optically couple said passive optical indicator to said light collector, wherein light travels therethrough from said leading portion to said trailing portion;
- said passive optical indicator having optical properties distinct from those of other portions of said trailing portion; and
- wherein said housing comprises one or more fasteners captured thereto, said passive optical indicator being disposed thereon.

2. The plug assembly of claim 1,
wherein said trailing portion further comprises an optical cable having a proximal end and a distal end.

3. The plug assembly of claim 1, wherein said light collector is disposed on said fastener.

4. The plug assembly of claim 1, wherein said optical coupling is disposed on said fastener.

5. The plug assembly of claim 1, wherein said light collector is disposed on said leading portion of said housing.

6. The plug assembly of claim 5, wherein said light collector is disposed integrally with said leading portion.

7. The plug assembly of claim 1, wherein said passive optical indicator is actuated by light incident thereon.

8. The plug assembly of claim 7, wherein said passive optical indicator is unpowered.

9. The plug assembly of claim 8, wherein said passive optical indicator is electrically isolated.

10. The plug assembly of claim 7, wherein said passive optical indicator is free of any non-optical power supply.

11. The plug assembly of claim 1, wherein said passive optical indicator comprises indicia disposed thereon.

12. The plug assembly of claim 11, wherein said indicia comprises alphanumeric characters.

13. The plug assembly of claim 11, wherein said indicia comprises graphics.

14. The plug assembly of claim 1, wherein said optical indicator comprises a diffuser.

15. The plug assembly of claim 1, wherein said optical coupling comprises an air gap.

16. The plug assembly of claim 2, wherein said optical coupling comprises fiber optics.

17. The plug assembly of claim 16, wherein said fiber optics comprises a light pipe.

18. The plug assembly of claim 16, wherein said fiber optics comprises one or more optical fibers.

19. The plug assembly of claim 1, wherein said light collector comprises a proximal end of said optical coupling.

20. The plug assembly of claim 1, wherein said passive optical indicator comprises a distal end of said optical coupling.

21. The plug assembly of claim 16, wherein said fiber optics extends along the length of said cable.

22. The plug assembly of claim 2, wherein said optical indicator is disposed at said proximal end of said cable.

23. The plug assembly of claim 22, wherein said optical indicator is disposed upstream of said cable.

24. The plug assembly of claim 2, wherein said optical indicator is disposed at said distal end of said cable.

25. The plug assembly of claim 24, wherein said optical indicator is disposed beyond said distal end of said cable.

26. The plug assembly of claim 24, comprising another optical indicator disposed at said proximal end of said cable.

27. The plug assembly of claim 24, comprising a connector coupled to said distal end of said cable.

28. The plug assembly of claim 27, wherein said optical indicator is disposed on said connector.

29. The plug assembly of claim 28, comprising another optical indicator disposed upstream of said cable.

* * * * *